United States Patent Office 3,497,534
Patented Feb. 24, 1970

3,497,534
6α-METHYL-OESTRENE COMPOUNDS
Cornelis Maurits Siegmann and Pieter Johannes Nicolaas van Luit, Oss, Netherlands, assignors to Organon Inc., West Orange, N.J., a corporation of New Jersey
No Drawing. Filed Oct. 10, 1966, Ser. No. 589,177
Claims priority, application Netherlands, Oct. 22, 1965, 6513663
Int. Cl. C07c *169/08;* A61k *17/00*
U.S. Cl. 260—397.4     5 Claims

ABSTRACT OF THE DISCLOSURE

New 6α-methyl-16,16-methylene steroids of the oestrene series, containing a free or esterified 17β-hydroxy group, possess strongly anabolic, ovulation-inhibiting, and progestative properties.

---

This invention relates to novel 6-methyl-oestrene compounds and to a process for the preparation thereof.

More particularly, this invention relates to novel 6-methyl-oestrene compounds of the formula:

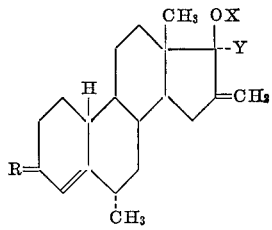

in which
R=H$_2$ or O,
X=H or acyl, and
Y=H or a saturated or unsaturated aliphatic hydrocarbon radical with 1–4 C-atoms.

The compounds according to the invention may be prepared by starting from a compound of the formula:

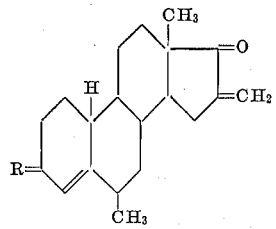

and by reducing this compound in 17-position to the corresponding 17β-hydroxy compound, or by an alkylation process leading to the corresponding 17α-alkyl (alkenyl or alkynyl)-17β-hydroxy compound, followed, if desired, by esterification of the 17β-hydroxyl group, in which, in case R=O, the Δ$^4$-3-keto group is temporarily partially protected.

The final products according to the invention possess strongly anabolic, ovulation inhibiting and progestative properties.

The starting product to be applied in the present process, Δ$^4$-6α-methyl-16-methylene-17-keto-oestrene, or the corresponding 3-keto compound thereof, may be prepared either by converting the Δ$^4$-6α-methyl-17-keto-oestrene via a Mannich reaction with formaldehyde and an amine, preferably dimethylamine or morpholine, into the corresponding 16-methyl-amino compound, preparing from it the 16-methylene compound by splitting off the amino group, for instance by means of steam distillation or treatment with silica gel, or by starting from the Δ$^5$-3β-acyloxy-17-keto-oestrene, introducing into it the 16-methylene group in the way as described before, and by converting the thus obtained Δ$^5$-3β-acyloxy-16-methylene-17-keto-oestrene via the 5α,6α-oxido compound by oxidation with a peracid, followed by reduction of the 17-keto group and treatment with for instance methylmagnesium-bromide into the 3β,5α,17β-trihydroxy - 6β - methyl - 16-methylene-oestrene, after which by oxidation of the 3- and 17-hydroxyl groups, splitting off the 5α-hydroxyl group by dehydration and isomerization of the 6β-methyl group the desired Δ$^4$-3,17-diketo-6α-methyl-16-methylene-oestrene is obtained. This compound may also be obtained by starting from the Δ$^4$-3,17-diketo-6α-methyl-oestrene, protecting temporarily in this compound the 3-keto group, for instance by conversion into an enolether, and next by introducing the 16-methylene group in the way as described before, after which the Δ$^4$-3,17-keto-6α-methyl-16-methylene-oestrene, the 3-keto group of which is temporarily protected, is obtained. The thus obtained compound may be immediately applied as starting product for the preparation of the compounds according to the invention, without splitting off first the protected group present in 3-position.

According to the process of the invention the 17-keto-oestrene compounds are converted by reduction into the corresponding 17β-hydroxy compounds, or by an alkylation reaction into the corresponding 17β-hydroxy-17α-alkyl compounds.

The reduction of the 17-keto group is performed by treatment with a reducing agent suitable for the purpose. Preferably an alkali metal borohydride or an alkali metal aluminiumhydride is used.

The preparation of the 17β-hydroxy-17α-alkyl compounds may take place by addition of a metal derivative of a saturated or unsaturated aliphatic hydrocarbon radical to the 17-keto group of the relative starting product. The metal derivative may be a magnesium halide, for instance the magnesiumbromide of the relative hydrocarbon, or the lithium derivative.

The preparation of the 17β-hydroxy-17α-alkynyl compounds may also take place by reaction of the 17-keto steroid with the relative alkyn, in the presence of an alkali metal or an alkali metal compound, such as an amide or an alcoholate.

The saturated or unsaturated hydrocarbon radical to be introduced into 17-position is for instance a methyl, ethyl, propyl, isopropyl, butyl, vinyl, propenyl, allyl, methallyl, ethynyl, propynyl, propargyl or butynyl group.

If the starting product has a 3-keto group, it is required that before the conversions described above this group is temporarily protected, preferably by conversion into a 3-enol-ether group, which group may be split off again afterwards by treatment with an organic or inorganic acid.

The thus obtained 17β-hydroxy, or 17β-hydroxy-17α-alkyl compounds may be esterified, if desired, at the 17-hydroxyl group. For the esterification is preferably used as an organic carboxylic acid with 1–18 carbon atoms, such as acetic acid, butyric acid, trimethyl acetic acid, caproic acid, capric acid, lauric acid, palmitic acid, stearic acid, hexahydrobenzoic acid, cyclopentyl-propionic acid, cyclohexyl acetic acid, adamantanic carboxylic acid, phenyl acetic acid, phenyl propionic acid, succinic acid and adipic acid.

The esterification may be performed in a conventional manner, by preference by reacting the relative acid chloride or acid anhydride in the presence of a tertiary base, such as pyridine or quinoline.

The invention is further illustrated by the following examples:

Example I

A mixture of 19 ml. of ethyl bromide and 90 ml. of tetrahydrofuran was added gently to 6 gm. of magnesium in 90 ml. of tetrahydrofuran. During this addition the reaction mixture was kept at boiling temperature, after which it was refluxed for 1 hour. The solution obtained was next decanted.

Through 100 ml. of tetrahydrofuran a stream of acetylene gas was led for 2 hours, after which the solution of ethylmagnesiumbromide obtained as mentioned before was added gently. To the thus obtained mixture a solution of 5 gm. of $\Delta^4$-6$\alpha$-methyl-16,16-methylene-17-keto-oestrene in 100 ml. of tetrahydrofuran were added at 0° C., after which the reaction mixture was kept at room temperature for 15 hours next cooled with ice water, after which a saturated ammonium chloride solution was added. The aqueous mixture was next extracted and the extract chromatographed over 360 gm. of $SiO_2$. The fraction obtained by elution with a mixture of petroleum-ether-benzene (1:1) was recrystallised from methanol to obtain the $\Delta^4$-6$\alpha$-methyl-16,16-ethylene-17$\beta$-hydroxy-17$\alpha$ - ethynyl - oestrene. Melting point=79–87° C.; $[\alpha]_D = -9°$ ($CHCl_3$).

To a solution of 2.15 gm. of this compound in 15 ml. of pyridine 4.15 gm. of acetic acid anhydride were added. The solution was stirred for 8 hours at 35° C., after which 25 ml. of water were added. The mixture was next stirred for 2 hours and afterwards extracted with ether after addition of 100 ml. of water. The ether extract was washed with 2 N hydrochloric acid and next with 1 N sodium hydroxide, next dried on sodium sulphate and finally evaporated to dryness. The residue was recrystallised from methanol to obtain the 17-acetate of $\Delta^4$-6$\alpha$-methyl-16,16-methylene-17$\beta$-hydroxy-17$\alpha$-ethynyl-oestrene.

In the same manner the 17-esters were prepared derived from trimethyl acetic acid, caprylic acid, $\beta$-phenyl-propionic acid and succinic acid.

Example II

In accordance with the process described in Example I the $\Delta^4$-6$\alpha$-methyl-16,16-methylene-17-keto-oestrene is converted into the corresponding 17$\beta$-hydroxy-17$\alpha$-allyl and the 17$\beta$-hydroxy-17$\alpha$-butynyl compounds by means of allyl magnesiumbromide or butynyl magnesiumbromide.

Example III

To a solution of 0.53 gm. of $\Delta^4$-3,17-diketo-6$\alpha$-methyl-16,16-methylene-oestrene in 3 ml. of dioxane 0.6 ml. of ethyl orthoformate and a solution of 6 mg. of p-toluene sulphonic acid in 0.6 ml. of dioxane and 0.25 ml. of ethanol were added, after which the mixture was shaken for 1 hour. Next 0.2 ml. of pyridine was added, after which the mixture was evaporated to dryness in vacuo. The residue was recrystallised from a mixture of methanol and ethanol, after which the 3-enolethylether of the relative compound was obtained.

0.25 gm. of this compound was dissolved in 14 ml. of 96% ethanol, after which a solution of 0.5 gm. of sodium borohydride in 15 ml. of 70% ethanol was added. The reaction mixture was stirred for 2 hours, next acidified with hydrochloric acid and next evaporated to dryness in vacuo, followed by recrystallisation of the residue from a mixture of ether and petroleumether to obtain the $\Delta^4$-3-keto-6$\alpha$-methyl - 16,16 - methylene - 17$\beta$-hydroxy-oestrene.

To a solution of 1 gm. of this compound in 9 ml. of pyridine 2 ml. of capric acid chloride were added, after which the reaction mixture was kept at room temperature for 18 hours. Next 20 ml. of water were added, after which stirring was continued for 2 hours. After the addition of water, extraction with ether and washing of the ether extract according to the process described in Example I, the 17-decanoate of 6$\alpha$-methyl-16,16-methylene-19-nor-testosterone was obtained.

According to the process described before and in Example I,, the 17-esters were also prepared derived from acetic acid, cyclohexyl butyric acid, $\beta$-phenyl-propionic acid and palmitic acid.

Analogoues to the reduction method described in this example, the $\Delta^4$-6$\alpha$-methyl - 16,16 - methylene-17-keto-oestrene was converted into the corresponding 17$\beta$-hydroxy compound and next converted into the corresponding 17$\beta$-hydroxy compound and next converted into the 17-esters derived from acetic acid, caproic acid, undecylic acid and $\beta$-phenyl-propionic acid.

Example IV

In accordance with the method described in Example I and Example II the 3-enolether of $\Delta^4$-3,17-diketo-6$\alpha$-methyl-16,16-methylene-oestrene (described in Example III) was converted into the corresponding 17$\beta$-hydroxy-ethynyl-, 17$\beta$-hydroxy-17$\alpha$-propynyl-, and 17$\beta$-hydroxy-17$\alpha$-methallyl compounds, which by treatment with an acid, such as described in Example III, were converted into the free $\Delta^4$-3-keto compounds.

Example V 0.7 ml. of methyl-iodide was added to a mixture of 1.7 gm. of lithium and 70 ml. of ether. This mixture was heated till the reaction started.

Next 70 ml. of ether were added, after which a mixture of 7 ml. of methyliodide and 50 ml. of ether were added gently, while the mixture was kept at boiling temperature. The mixture was refluxed for 1 hour, next cooled and filtered. The filtrate was added to a solution of 5 gm. of $\Delta^4$-6$\alpha$-methyl-16,16-methylene-17-keto-oestrene in 250 ml. of tetrahydrofuran, after which the mixture was stirred at room temperature and in nitrogen atmosphere for 3 hours, next poured out into ice water acidified with 50 ml. of 2 N sulphuric acid. The aqueous mixture was extracted with ether and the extract chromatographed over 150 gm. of silicagel, in which the fraction, eluted with benzene, yielded the $\Delta^4$-6$\alpha$-17$\alpha$-dimethyl-16,16-methylene-17$\beta$-hydroxy-oestrene ($[\alpha]_D = -64°$ ($CHCl_3$)).

In an analogous manner the $\Delta^4$-6$\alpha$-methyl-16,16-methylene-17-keto-oestrene was converted into the corresponding 17$\beta$-hydroxy-17$\alpha$-ethyl, and the 17$\beta$-hydroxy-17$\alpha$-propyl compounds.

By esterification of these compounds according to the processes described in Examples I and III, the 17-esters were obtained derived from acetic acid, oenanthic acid, $\beta$-phenyl-propionic acid and palmitic acid.

We claim:

1. Novel 6$\alpha$-methyl-oestrene compounds of the formula:

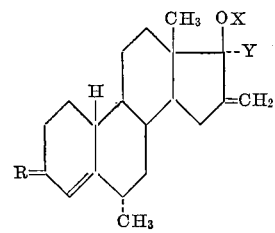

wherein
R is selected from the group consisting of $H_2$ and O,
X is selected from the group consisting of hydrogen and an acyl group, and Y is selected from the group consisting of hydrogen and a saturated and unsaturated aliphatic hydrocarbon radical with 1-4 carbon atoms.

2. Novel 6α-methyl-oestrene compounds of the formula:

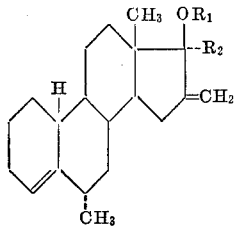

wherein
$R_1$ is selected from the group consisting of hydrogen and an acyl group derived from an organic carboxylic acid with 1-18 carbon atoms, and
$R_2$ is selected from the group consisting of an alkyl, alkenyl and alkynyl group with 1-4 carbon atoms.

3. $\Delta^4$-6α,17α-dimethyl - 16,16 - methylene-17β-hydroxy-oestrene.

4. $\Delta^4$-6α-methyl-16,16-methylene - 17β - hydroxy-17α-ethyl-oestrene.

5. $\Delta^4$-3-keto - 6α - methyl - 16,16 - methylene-17β-hydroxy-17α-ethynyl-oestrene.

References Cited

UNITED STATES PATENTS

| | | | |
|---|---|---|---|
| 3,275,666 | 9/1966 | Siegmann | 260—397.5 |
| 3,313,832 | 4/1967 | Siegmann et al. | 260—397.3 |

ELBERT L. ROBERTS, Primary Examiner

U.S. Cl. X.R.

260—397.5, 999